3,597,163
SOLVENT EXTRACTION APPARATUS
Anthonie van Hengel, Westville, Natal, Republic of South
 Africa, assignor to Hulett's Sugar Corporation Limited, Durban, Natal, Republic of South Africa
Filed Oct. 21, 1969, Ser. No. 868,178
Claims priority, application Republic of South Africa,
Oct. 21, 1968, 68/6,802
Int. Cl. B01d 11/02; C13d 1/02
U.S. Cl. 23—270          3 Claims

ABSTRACT OF THE DISCLOSURE

A solvent extraction apparatus in which sub-divided solids are moved through at least two extraction stages, extracting liquid being circulated independently in each stage, and the extraction liquid being moved from stage to stage countercurrent relative to the movement of the solids.

---

The present invention relates to a solvent extraction process and apparatus therefor.

Although this specification makes particular reference to the extraction of sucrose from sugar cane, it must be understood that the invention also covers the extraction of any available soluble substances from any type of sub-divided solids containing such substances.

The extraction of sucrose from sugar cane or beet generally comprises two major stages: Firstly a particle size reduction stage, during which the cane or beet is prepared to a certain fineness; and secondly, the crushing and/or the diffusion or lixiviating stage. The meaning of the term "diffusion" as herein used is that which is commonly attached to it throughout the sugar industry and may include such specific phenomena as washing, lixiviation, molecular or osmotic diffusion, displacement, etc. In this latter stage the prepared cane material or bagasse is conveyed and by percolation and/or counter-current flowing of a suitable water-sucrose mixture, the residual sucrose is displaced and separated from the tissue structure. This invention concerns itself in particular with this second stage. It is normal to submit the residual fibrous material of the second stage to a dewatering process by suitable means. The liquid so extracted is termed "press water."

Various apparatus and methods are known to effect the diffusion stage. In one case bagasse is transported horizontally through a diffuser on a drag conveyor over stationary perforated plates, while counter-current flow takes place. In another case, this drag conveyor is substituted by a screen conveyor. A further apparatus, among others, includes two inclined co-operating screw conveyors by means of which the bagasse is transported upwardly, while the liquid flow is directed downwardly through the bagasse.

Generally the object of a good diffusion apparatus or method is to obtain a high percentage of sucrose extraction with a low cost of installation. Some of the known apparatus provide a high percentage of sucrose extraction—but the cost of the installation is formidable. Other installations are relatively inexpensive, but fail on the requirement of high sucrose extraction. Also, if the quality of the cane material is of insufficient standard, the efficiency of the diffuser may be affected detrimentally.

It is an object of the invention to provide a method and an apparatus for solvent extraction from sub-divided solids which generally will provide an improved percentage extraction, while being less sensitive to input material quality or rate of throughput at a reduced cost of installation.

In the field of sucrose extraction from sugar cane, it is a further object of the invention to achieve a higher percentage of crystallizable sucrose from the sucrose extracted in the diffusion process.

According to the invention, a method for extraction of soluble substances from sub-divided solids includes the steps of moving sub-divided solids through at least two extraction stages, of circulating extracting liquid in each stage independently of such circulation in any other stage, and of moving the liquid from stage to stage countercurrent relative to the movement of the solids.

Further according to the invention, a method for extraction of soluble substances from sub-divided solids, includes the steps of moving sub-divided solids through at least two extraction stages, of creating an extracting liquid reservoir in each stage, circulating this liquid in each stage over the solids and at the same time causing liquid from a reservoir of one stage to flow into the reservoir of a preceding stage.

At least a substantial portion of the sub-divided solids may be unsettled while moving from one stage to the next.

The sub-divided solids may be transported over at least two separate transportation stages, in which the sub-divided solids are allowed to fall under gravity from one transportation stage to the succeeding stage, and in which soluble substances are extracted in each stage by percolating extracting liquid under gravity through the sub-divided solids, while being transported.

The rate of circulation of the extracting liquid in each stage may be independently variable.

Yet further according to the invention an apparatus for the extraction of soluble substances from sub-divided solids, includes at least two extraction stages; transportation means for transporting the sub-divided solids through the extraction stages; independent circulating percolation means for circulating extraction liquid in each stage for extracting soluble substances in the sub-divided solids; and means for moving the liquid from stage to stage countercurrent to the movement of the solids.

Also according to the invention, an apparatus for the extraction of soluble substances from sub-divided solids, includes at least two extraction stages; transportation means for transporting the sub-divided solids through the extraction stages; an extracting liquid reservoir in each stage; circulating percolation means to circulate liquid in each stage over the solids, and means concurrently to cause liquid to flow from a reservoir of one stage into the reservoir of the preceding stage.

The apparatus may include unsettling means for unsettling at least a substantial portion of the sub-divided solids while being transported from one stage to the next.

The unsettling means may be adapted to lift the sub-divided solids from and re-deposit it on the transportation means.

The unsettling means may be a screw arrangement adapted to lift the sub-divided solids; a screw arrangement adapted to lift the sub-divided solids over an inclined retention wall; or an elongated scoop wheel.

The apparatus may include at least two separate, staggered transportation stages each having a transportation means for transporting the sub-divided solids, and being arranged so that the solids fall under gravity from one transportation means onto a succeeding transportation means.

The percolation means for each stage may include a receiving vessel, and an arrangement to displace extracting liquid to the percolation system of a preceding stage.

The sub-divided solids may consist of sub-divided sugar cane.

The invention will now be described by way of example with reference to the accompanying drawings.

Figure 1:
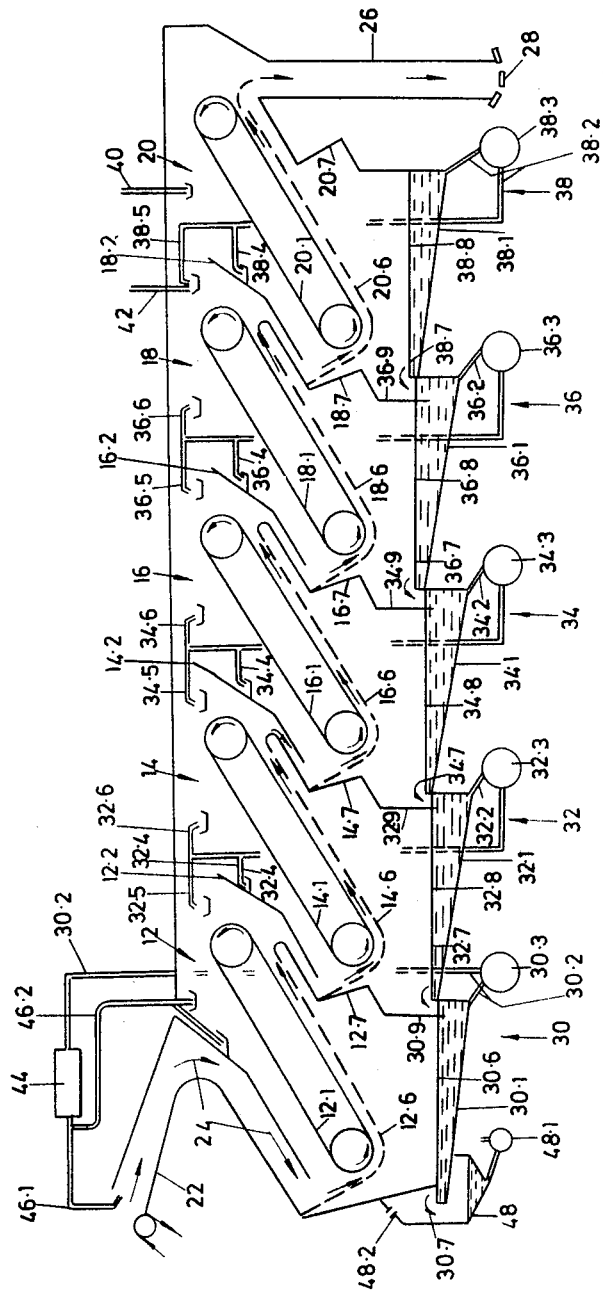
FIG. 1 shows a diagrammatic side view of a sugar cane diffuser according to the invention.
Figure 2:
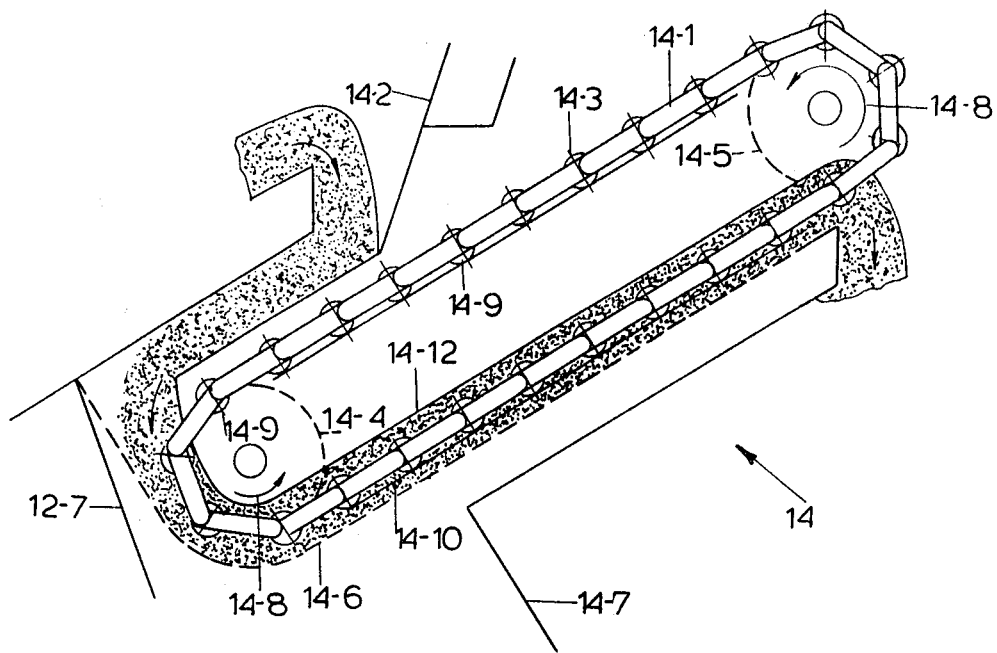
FIG. 2 shows, on a larger scale, a detailed side view of part of one transportation stage of the diffuser of FIG. 1.

Referring to FIGS. 1 and 2 of the drawings, the diffuser, generally indicated by reference 10 in FIG. 1, shows five transportation stages 12, 14, 16, 18 and 20. Obviously in practice any number of stages may be provided, depending on various factors, such as the time delay for the bagasse bed in each stage, and the thickness of the bagasse bed.

Prepared cane or bagasse is fed into the supply channel 22 and moves in the direction indicated by arrows 24 to be picked up by the endless conveyor system 12.1 of the first transportation stage 12. The bagasse is transported to the top of the transportation system and drops under gravity onto the guide plate 12.2 and thence onto the conveyor system 14.1 of the next transportation stage 14. This process is repeated up to the end of the last transportation stage 20.

The bagasse layer is, therefore, broken up and reformed when the bagasse passes from one stage to another. Accordingly, the effects of bagasse stratification and plugging of the bed are limited and permeability is re-established.

After leaving the last transportation stage 20 the bagasse drops into the chute 26 and onto a conveyor system 28 for removal.

Each transportation stage is provided with a percolation liquid circulation system, respectively indicated by reference numerals 30, 32, 34, 36, 38. Below each conveyor system a reservoir vessel 30.1 . . . 38.1 is provided. From each vessel a pipe 30.2 . . . 38.2 is provided together with a pump 30.3 . . . 38.3 for spreading the liquid over the surface of the bagasse on the respective conveyor system.

As indicated in respect of percolation system 32, the liquid, pumped in pipe 32.2, is branched into three spraying sections 32.4, 32.5, 32.6. Thereby the liquid coming out of pipe 32.5 is guided onto the bagasse while it passes over the guide plate 12.2, the liquid from pipe 32.4 is guided onto the bagasse while it is at the lower end of the conveyor system 14, and liquid from the pipe 32.6 is guided onto the bagasse at the upper end of the conveyor system 14. The ratio of the liquid flowing from pipes 21.4, 32.5, 32.6 may be 1:2:1. The same applies to the percolation systems 34, 36. In fact, as many points of percolation per stage as required can be used. System 38 is shown to have two outlets 38.4 and 38.5.

Overflow takes place from the free liquid surface 38.8 as shown by arrow 38.7 from vessel 38.1 to vessel 36.1 and then progressively to vessel 30.1. As is shown in the drawings, the overflow always takes place from the higher solids concentration end of any specific vessel.

In addition a guide plate, 30.9, 32.9 . . . 36.9 is provided for guiding liquid overflowing from the succeeding vessel to a position where it is drawn in preference to other liquid in the vessel by the pump of the receiving vessel.

At the final stage, fresh extracting liquid is supplied by a pipe 40 onto the bagasse while it is at the upper part of the conveyor system 20.

Also press water from the bagasse de-watering stage (not shown) is supplied via the pipe 42 to join liquid flowing from the pipe 38.5.

The liquid pumped into pipe 30.2 passes through a suitable heater 44. Thence it passes via pipe 46.1 to join the material entering supply channel 22 and via pipe 46.2 onto the bagasse while it is being moved upwardly in the conveyor. Thereby the material, when entering the diffuser, is percolated and simultaaneously its temperature is raised to a suitable level.

The vessel 30.1 overflows into the vessel 48 and the liquid collected is pumped by a pump 48.1 to the subsequent purification stage (not shown). Vessel 48 is provided with a pressure equalisation opening 48.2.

Due to the fact that each percolation system is independent and pumping of liquid takes place back into its own reception vessel, therefore, a high degree of contact between the bagasse and the juice may be achieved, as the quantity of percolating liquid can be selected as required. Should the diffuser have to be stopped for any reason, liquid circulation can continue as no percolation system can be pumped dry.

In FIG. 2 a view of part of the transportation stage 14 is shown. This is identical to all other transportation stages. As shown, the transportation stage includes an endless conveyor 14.1 having a series of spaced gripping members 14.3 and passing over sprockets 14.4 and 14.5, of which sprocket 14.5 provides the drive. A stationary screen 14.6 separates the system 14 from the vessel 32.1, as shown in FIG. 1. Screen 14.6 is continuously cleaned by the scraping action of the transverse members 14.3 while conveying the bagasse upwardly on the screen 14.6. The deflector plate 14.7 guides the screened liquid into the vessel 32.1. The screen must necessarily be smooth, independent of the type of perforation in order to allow the cleaning action to take place without power loss due to friction.

As is shown in FIG. 2, the volume between two adjacent gripping members 14.3 is greater on the outer side (and smaller on the inner side), while these are passing over the sprocket 14.4 in the direction indicated by arrow 14.8, than while on the straight position between the sprockets 14.4 and 14.5. This, together with the free fall of the bagasse between 14.2 and screen 14.6, results in considerable mechanical action on the bagasse. Thereby stage efficiency is also improved.

The rollers 14.9 of the conveyor 14.1 run on guide plates 14.10 and 14.11 to prevent sagging. The bagasse layer, while transported, is indicated by section 14.12.

Figure 3:
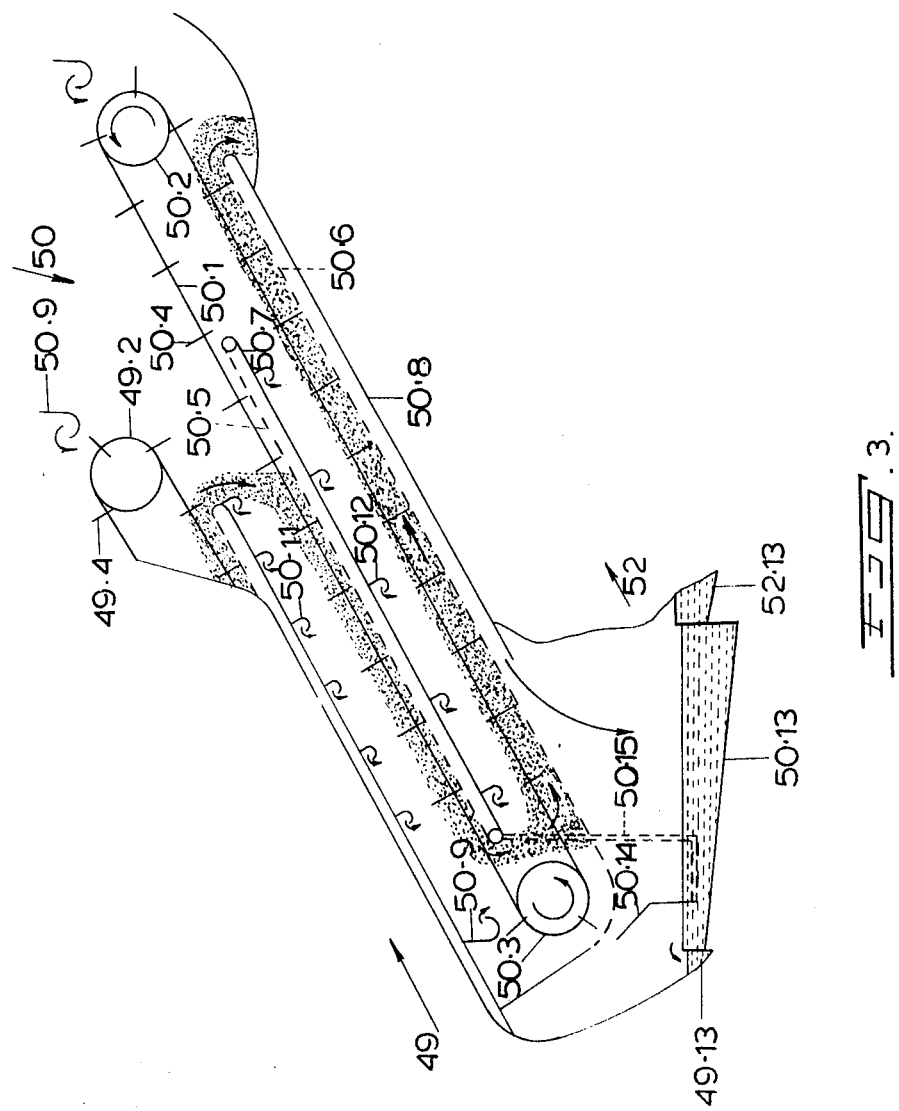
FIG. 3 shows a side view of a second design of one transportation stage.

In FIG. 3 is shown a detailed side view of a part of an alternative arrangement of a transportation stage.

Similarly as in FIGS. 1 and 2, the various stages are of similar construction. In this drawing the transportation stage 50, includes an endless conveyor 50.1 passing over sprockets 50.2 and 50.3 of which sprocket 50.2 provides the drive. The conveyor is fitted with transverse flights 50.4 which slide along fixed screens 50.5 and 50.6 situated below the conveyor strands. The screens 50.5 and 50.6 are positioned so that the bagasse, after falling onto the top conveyor strand, is carried downwardly and along the upper screen 50.5. To obviate trapping of the material between the screen and moving parts, the bagasse, before reaching the sprocket 50.3, falls over the lower edge of the upper screen 50.5 onto the lower conveyor strand, thereby re-establishing permeability of the bagasse, whence it is conveyed upwardly and along the lower screen 50.6. On reaching the upper termination of the lower screen 50.6 the bagasse falls onto the top strand of the next identical transportation stage 52 (not shown).

The provision of screens to both upper and lower strands of the conveyor 50.1 increases the effective length of screen per transportation stage, thereby facilitating, for example, use of a higher rate of travel with a proportionally thinner layer of bagasse, giving improved percolation and, therefore, increased stage efficiency, and/or reduction of the conveyor centre distance, and/or increase of throughput.

This all leads to a decreased residence time of processed materials, which contributes to the minimization of undesirable reactions, which reactions render sucrose, although extracted in high yield, non-crystallizable and thereby reducing the overall economic efficiency of a diffuser installation.

Below the screens 50.5 and 50.6 are fitted collector plates 50.7, and 50.8 which guide the screened liquid to the vessel 50.13. From the vessel 50.13 liquid is recirculated by a pump (not shown) to the sprocket washers 50.9 and 50.10, and via the galleries 50.11 and 50.12 to the bagasse on the screens 50.5 and 50.6 for continuing percolation.

A baffle plate 50.14 is fitted into the vessel 50.13 for reducing circulation within the vessel 50.13, and for allowing continuous overflow into the adjacent vessel 49.13 preferentially from the upper screen 50.5 (e.g. by means of an external pipe 50.15 leading from the bottom part of the collector plate 50.7 to the baffle plate 50.14). The vessel 50.13 also receives liquid from vessel 52.13 so that the leanest liquid is in vessel 52.13 and is progressively richer in vessels 50.13 and 49.13 of stage 49 (not shown).

The transportation stages shown in FIGS. 2 and 3 may be provided removably in the diffuser 10. For instance, a door may be provided on the outside, and a transportation stage, slidably mounted on rails may be removed and replaced. This means that a while unit (i.e. including the gears, the conveyor and the guide plates) can be removed for repair or servicing.

Due to the repeated bagasse layer re-formation, an improved percolation results. The sub-divided cane can, therefore, be of finer sub-division which creates increased extraction efficiency, and leads to shorter diffusion time.

In practice, the depth of the bagasse bed may be about 2 feet. The thinner the layer, the better the percolation in each stage. Thereby the residence time in the diffuser as a whole may be reduced as a result of the higher stage efficiency thus obtained.

A free outflow of juice and bagasse is impossible due to the inclination of the last transportation stage and, therefore, a press roller, as commonly fitted to some types of diffuser, is not necessary.

Also, clarification of the press water from the dewatering device prior to its re-introduction into the diffuser system is unnecessary because:

(1) A high percolation rate is achieved by applying the percolating liquid to a thin layer of bagasse which is, moreover repeatedly re-formed between stages.
(2) The press water is mingled with the bagasse entering the final transportation stage 20, when flowing from pipe 42 onto plate 18.2, thus ensuring equal distribution through the moving bed of particles liable to plug it.

This gives the advantage that the requirement for retention time for dilute juice in the press water clarification is avoided. Thus chemicals are not used, colour formation is reduced and overall sugar recovery is enhanced.

Figure 4:
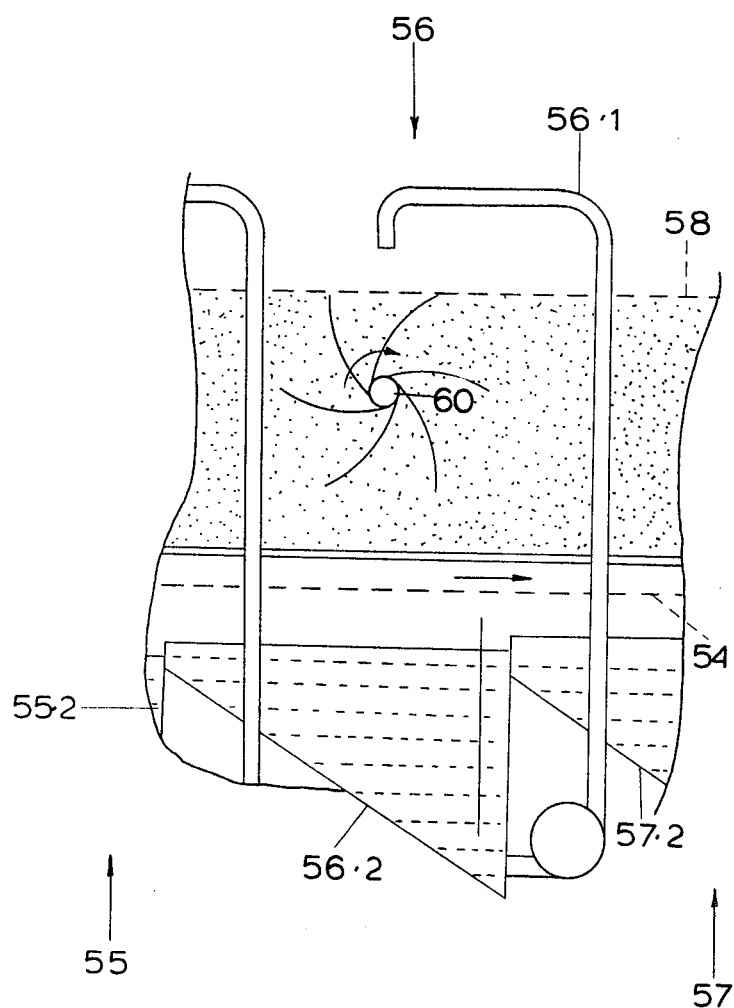
FIG. 4 shows a side view of a third design of one transportation stage.
Figure 5:
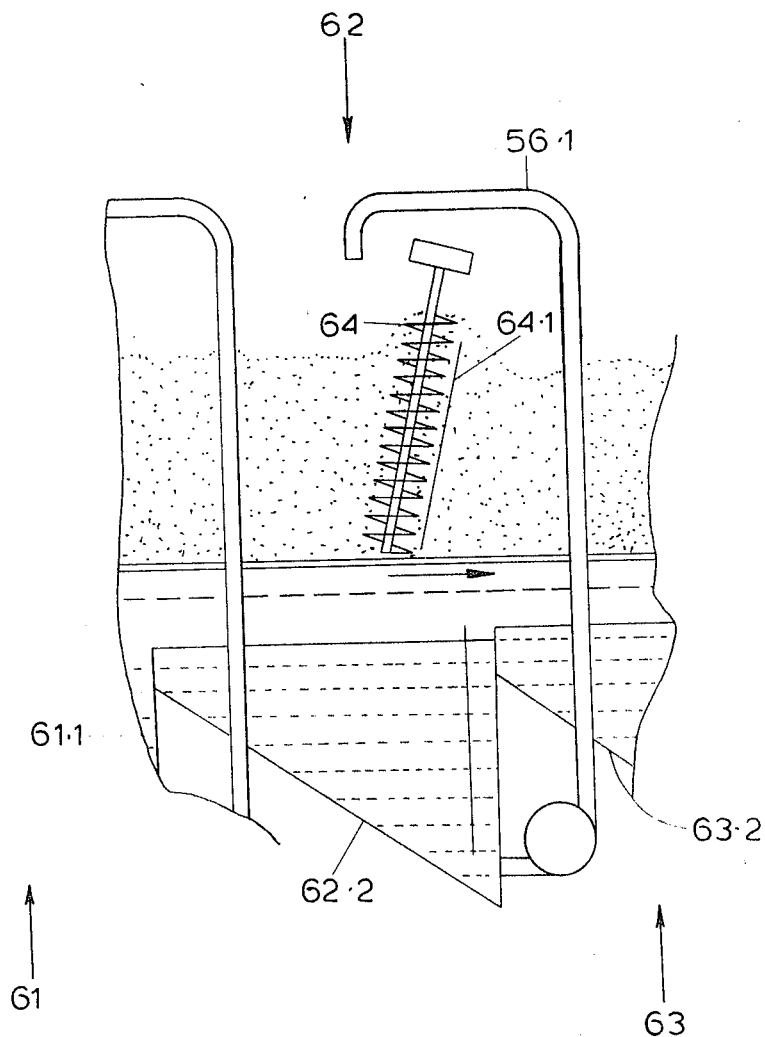
FIG. 5 shows a side view of a fourth design of one transportation stage.

In FIGS. 4 and 5 a diffuser having a horizontal conveyor system 54, with separate unsettling and extraction stages, is shown.

FIG. 4 shows an extraction stage 56 in which the unsettling of the bagasse layer 58 takes place by means of an elongated scoop wheel 60. Percolation liquid is supplied by means of the pipe 56.1 and distributed to various positions as may be required.

Similar to the arrangement of FIGS. 1 to 3, each stage has its own reception vessel, and overflow takes place from lower to higher concentration against the movement of the bagasse, i.e. from vessel 57.2 (of stage 57) to vessel 56.2 and thence to vessel 55.2 (of stage 55).

The number of consecutive stages (all being similar to stage 56) will depend on practical requirements.

In FIG. 5 the stage 62 is the same as stage 56 of FIG. 4, but instead of the scoop wheel 60, a screw arrangement 64 is provided. This screw arrangement is adapted to convey the bagasse of the bagasse layer 58 over a retaining wall 64.1 thereby unsettling it. A number of adjacent screw arrangements may be provided, if necessary.

Similar to FIG. 4, percolation liquid is supplied by means of pipe 56.1, and liquid overflow takes place from vessel 63.7 (of stage 63) to vessel 62.2 and thence to vessel 61.1 (of stage 61).

The number of consecutive stages (all being similar to stage 62) will depend on practical requirements.

I claim:

1. Apparatus for the extraction of soluble substances from subdivided solids by percolation, which includes at least two extraction stages, each stage having a conveyor to move the solids as a bed therethrough and to the next stage, the latter movement being accompanied by unsettling of the bed and formation of a new bed, each stage including means to circulate extracting liquid in that stage independently of other stages, the circulation being from means above the bed through the bed by percolation to a reservoir and back to the said means; and an overflow from each reservoir to the reservoir of the preceding stage having regard to the direction of flow of the solids.

2. Apparatus for the extraction of soluble substances from subdivided solids by percolation, which includes at least two extraction stages, each having a perforated conveyor at an incline and overhanging the next succeeding inclined conveyor, in such a manner that the solids from a conveyor fall under gravity onto the next succeeding conveyor, each stage including means to circulate extracting liquid in that stage independently of other stages, the circulation being from spray means above the conveyor, through the bed by percolation to a reservoir and back to the spray means, and an overflow from each reservoir to the reservoir of the preceding stage having regard to the direction of flow of the solids.

3. Apparatus as claimed in claim 2 in which each conveyor is an endless conveyor arranged to transport the subdivided solids downwardly along its descending flight and upwardly along its ascending flight.

References Cited
UNITED STATES PATENTS

| | | | |
|---|---|---|---|
| 1,006,311 | 10/1911 | Steffen | 127—6 |
| 2,703,274 | 3/1955 | Giesse | 23—310X |
| 3,275,472 | 9/1966 | Tantawi | 127—5 |
| 3,420,708 | 1/1969 | Schaffer | 23—270 |
| 3,425,869 | 2/1969 | Farmer | 127—5X |

MORRIS O. WOLK, Primary Examiner

S. MARANTZ, Assistant Examiner

U.S. Cl. X.R.
23—310; 127—6, 45